US009287914B2

(12) United States Patent
Minard et al.

(10) Patent No.: US 9,287,914 B2
(45) Date of Patent: Mar. 15, 2016

(54) FRONTAL BLOCK WITH INTERGRATED ANTENNA

(75) Inventors: Philippe Minard, Saint Medard sur Ille (FR); Dominique Lo Hine Tong, Rennes (FR); Philippe Chambelin, Chateaugiron (FR); Corinne Nicolas, La Chapelle des Fougeretz (FR)

(73) Assignee: Thomson Licensing, Issy-les-Moulineaux (FR)

(*) Notice: Subject to any disclaimer, the term of this patent is extended or adjusted under 35 U.S.C. 154(b) by 338 days.

(21) Appl. No.: 12/737,204

(22) PCT Filed: Jun. 25, 2009

(86) PCT No.: PCT/EP2009/058006
§ 371 (c)(1), (2), (4) Date: Dec. 17, 2010

(87) PCT Pub. No.: WO2009/156489
PCT Pub. Date: Dec. 30, 2009

(65) Prior Publication Data
US 2011/0090125 A1 Apr. 21, 2011

(30) Foreign Application Priority Data
Jun. 26, 2008 (FR) ..................................... 08 54289

(51) Int. Cl.
*H01Q 1/38* (2006.01)
*H04B 1/3827* (2015.01)
(Continued)

(52) U.S. Cl.
CPC .......... *H04B 1/3827* (2013.01); *H01Q 1/2283* (2013.01); *H01Q 1/38* (2013.01); *H01Q 5/364* (2015.01); *H01Q 9/0407* (2013.01)

(58) Field of Classification Search
CPC ........... H01Q 9/42; H01Q 1/38; H01Q 1/243
USPC .................................. 343/700 MS, 845, 702
See application file for complete search history.

(56) References Cited

U.S. PATENT DOCUMENTS 5,448,249 A 9/1995 Kushihi et al.
5,995,047 A * 11/1999 Freyssinier et al. .... 343/700 MS (Continued)

FOREIGN PATENT DOCUMENTS

CN 1369914 9/2002
CN 1917285 2/2007

(Continued)

OTHER PUBLICATIONS

IEEE Standard 802.11a-1999, "Part 11: Wireless LAN Medium Access Control (MAC) and Physical Layer (PHY) specifications: High-speed Physical Layer in the 5 GHZ Band", Sep. 16, 1999, pp. 1-90.

(Continued)

*Primary Examiner* — Dameon E Levi
*Assistant Examiner* — Collin Dawkins
(74) *Attorney, Agent, or Firm* — Myers Wolin LLC

(57) ABSTRACT

The invention relates to an RF reception front end block comprising a first substrate and an RF integrated front end module integrated onto a second substrate supporting a radiating part of the antenna.
The antenna is in addition formed by:
a first radiating part supported by the substrate and
by a junction constituted by a third radiating part connecting the first radiating part and the part supported by the substrate.

16 Claims, 7 Drawing Sheets

Figure 1:
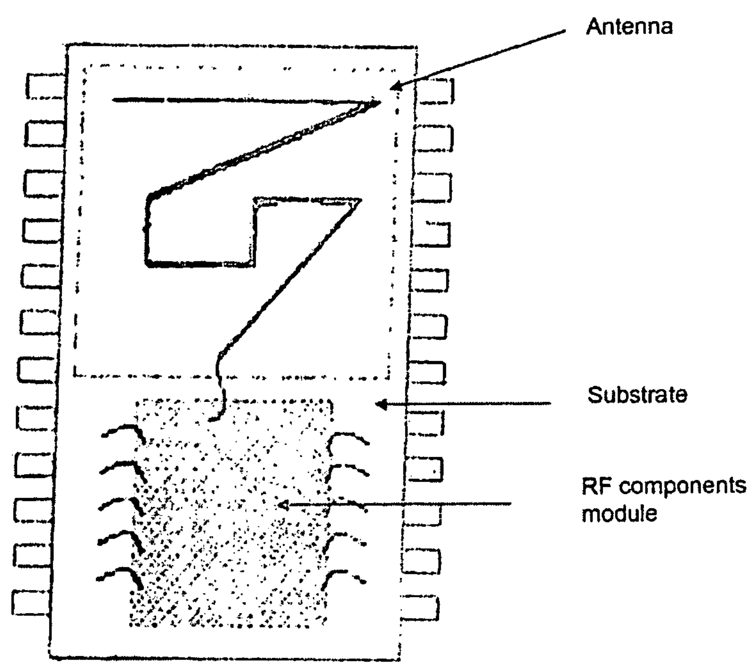

Part P1 of the antenna on the substrate S1
Supply of the antenna through via
Part P3 of the antenna on the substrate S3
Vertical part P3 of the antenna on the substrate S2 or S3

(51) Int. Cl.

| | |
|---|---|
| ***H01Q 1/22*** | (2006.01) |
| ***H01Q 9/04*** | (2006.01) |
| ***H01Q 5/364*** | (2015.01) |

(56) References Cited

U.S. PATENT DOCUMENTS

| | | | | |
|---|---|---|---|---|
| 6,879,287 | B2 | 4/2005 | Popov et al. | |
| 7,030,819 | B2 | 4/2006 | Horibe | |
| 7,057,565 | B1 * | 6/2006 | Liu | 343/700 MS |
| 7,071,878 | B2 * | 7/2006 | Masutani | 343/700 MS |
| 7,362,286 | B2 * | 4/2008 | Fang | 343/895 |
| 2002/0171591 | A1 | 11/2002 | Beard | |
| 2004/0075608 | A1 * | 4/2004 | Scott et al. | 343/700 MS |
| 2005/0059371 | A1 * | 3/2005 | Block et al. | 455/217 |
| 2006/0160504 | A1 | 7/2006 | Ichitsubo et al. | |
| 2006/0285480 | A1 | 12/2006 | Jonofsky | |
| 2008/0012780 | A1 * | 1/2008 | Harada et al. | 343/859 |
| 2008/0036668 | A1 * | 2/2008 | White et al. | 343/745 |
| 2008/0129645 | A1 * | 6/2008 | Berlin et al. | 343/909 |
| 2008/0174503 | A1 * | 7/2008 | Kim et al. | 343/722 |
| 2008/0191956 | A1 * | 8/2008 | Watanabe | 343/841 |

FOREIGN PATENT DOCUMENTS

| | | | |
|---|---|---|---|
| DE | 4306056 | 9/1993 | |
| EP | 1126522 | 8/2001 | |
| JP | 09051210 | 2/1997 | |
| JP | 2001351085 | 12/2001 | |
| JP | 200216630 | 1/2002 | |
| JP | 200216630 A | 1/2002 | |
| JP | 2003196614 A2 | 7/2003 | |
| JP | 2004153607 A2 | 5/2004 | |
| JP | 2004533166 | 10/2004 | |
| JP | 2005073168 A | 3/2005 | |
| JP | 2006287472 | 10/2006 | |
| TW | 280683 | 7/1996 | |
| WO | WO0021032 | 4/2000 | |
| WO | WO2004042868 | 5/2004 | |
| WO | WO2007096869 | 8/2007 | |
| WO | WO 2007138157 A1 * | 12/2007 | H01Q 5/01 |

OTHER PUBLICATIONS

IEEE Standard 802.11b-1999 (R2003), "Part 11: Wireless LAN Medium Access Control (MAC) and Physical Layer (PHY) specifications: Higher-speed Physical Layer Extension in the 2.4 Ghz Band", Sep. 16, 1999, pp. 1-96.

IEEE Standard 802.11g-2003, "Part 11: Wireless LAN Medium Access Control (MAC) and Physical Layer (PHY) specifications Amendment 4: Further Higher Data Rate Extension in the 2.4 Ghz Band", Jun. 27, 2003, pp. 1-78.

Seki et al., "Microstrip array antenna with parasitic elements alternately arranged over two layers of LTCC substrate for millimeter wave applications", 2007 IEEE Radio and Wireless Symposium, Long Beach, California, USA, Jan. 9, 2007, pp. 149-152.

Tentzeris et al., "3-D-integrated RF and millimeter-wave functions and modules using liquid crystal polymer (LCP) system-on-package technology", IEEE Transactions on Advanced Packaging, vol. 27, No. 2, May 2004, pp. 332-340.

Hiura et al., "RF module using MCM-L and BGA technology for 5 GHz WLAN application", 33rd European Microwave Conference Proceedings, Munich, Germany, Oct. 7, 2003, pp. 895-898.

Kim et al., "High performance RF passive integration on a Si smart substrate for wireless applications", Electronics and Telecommunications Research Institute Journal, vol. 25, No. 2, Apr. 2003, pp. 65-72.

Ryckaert et al., "Single-package 5GHz WLAN RF module with embedded patch antenna and 20dBm power amplifier", 2003 IEEE MTT-S International Microwave Symposium Digest, vol. 2, 2003, pp. 1037-1040.

Diels et al., "Single-package integration of RF blocks for a 5 GHz WLAN application", IEEE Transactions on Advanced Packaging, vol. 24, No. 3, Aug. 2001, pp. 384-391.

Lim et al., "Development of planar antennas in multi-layer packages for RF-system-on-a-package applications", IEEE 10th Topical Meeting on Electrical Performance of Electronic Packaging, Cambridge, Massachusetts, USA, Oct. 29, 2001, pp. 101-104.

Bairavasubramanian et al., "Development of mm-wave dual-frequency multilayer antenna arrays on liquid crystal polymer (LCP) substrate", 2005 IEEE Antennas and Propagation Society International Symposium, vol. 1B, 2005, pp. 393-396.

Xiao et al., "Design of low-profile microstrip antenna with enhanced bandwidth and reduced size", IEEE Transactions on Antennas and Propagation, vol. 54, No. 5, May 2006, pp. 1594-1599.

Pinel et al., "System-on-Package (SOP) architectures for compact and low cost RF front-end modules", 33rd European Microwave Conference, Munich, Germany, Oct. 7, 2003, pp. 307-310.

Jow et al., "Functional embedded RF circuits on multi-layer printed wiring board (PWB) process", 2005 Electronic Components and Technology Conference, vol. 2, 2005, pp. 1634-1641.

Pinel et al., "3D integrated LTCC module using muBGA technology for compact C-band RF front-end module", 2002 IEEE MTT-S International Microwave Symposium Digest, vol. 3, 2002, pp. 1553-1556.

Song et al., "Antenna design for packaged integrated RF front ends", IEE Seminar Integrated and Miniaturised Antenna Technologies for Asset Tracking Applications, London, United Kingdom, Nov. 23, 2000, pp. 1-4.

* cited by examiner

FRONTAL BLOCK WITH INTERGRATED ANTENNA

This application claims the benefit, under 35 U.S.C. §365 of International Application PCT/EP2009/058006, filed Jun. 25, 2009, which was published in accordance with PCT Article 21(2) on Dec. 30, 2009 in French and which claims the benefit of French patent application No. 0854289, filed Jun. 26, 2008.

The present invention relates to integrated Front End blocks and more specifically to the integration of antennas into RF integrated Front End modules.

This invention falls within the scope of the Gigabit Wireless Technology project, where one of the objectives is to propose solutions for RF integrated front end modules and associated antennas for the applications implementing the WLAN standards notably 802.11bg and 802.11a.

The use of "System In Package" (SIP) technology enables the manufacturing costs of such modules to be reduced. Thus within a module a balun, filter, power amplifier, low noise amplifier and switch type functions and the adaptation networks associated with some of these functions will be integrated. Materials with heightened permittivity such as for example the ceramic used with a particular manufacturing method called LTCC (Low Temperature Cofired Ceramic) are used. They thus enable a reduction of the length of connections. Thus the associated antennas are integrated as close as possible to these modules.

The document IEEE 2003 vol. 150, N° 4 Aug. 2003 entitled "Novel RF front end antenna package" by S. T. R. Song et al describes a concept of integration of small antennas known as "patch antennas" on a semi-conductor substrate that likewise supports the RF front end module circuits.

The document EP1126522 (Alcatel) "Packaged integrated circuit (PIC) with radio frequency antenna" describes a block comprising the RF components included in a module as well as an associated RF antenna.

The document WO2004-042868A1 (Integrated circuit package including miniature antenna) proposes antennas juxtaposed with modules of RF components and integrated on the same substrate as the module itself as shown in FIG. 1. The set of solutions presented in this document requires a hollowing out of the ground plane of the substrate onto which is transferred the RF front end module in a way to favour the radiation patterns of the antenna integrated in the RF front end module.

The major disadvantage of these solutions is that a juxtaposition of functions of the antenna and of the RF module is not optimal from the point of view of bulkiness.

The use of such integrated modules is especially only useful if the associated antenna or antennas can be integrated as close as possible to these modules.

But the integration of antennas to RF front end modules generally requires the size or the thickness of the modules to be increased and often poses problems of bulkiness.

In fact, the size of these RF front end modules intended for WLAN applications is less than a square of 1 cm a side.

However to integrate resonant antennas at their fundamental mode at 2.45 GHz or at 5.25 GHz, it must be considered that a quarter of a wavelength already represents more than 3 cm or more than 1.4 cm for a dielectric permittivity of the ceramic used, thus much greater than the size of the integrated RF front end module.

In addition the use of WLAN 802.11bg and 802.11a standards leads to a system of diversity in the order of 2. It is thus necessary to be able to integrate at least two antennas, for spatial or diagram diversities, or possibly one antenna but that offers two orthogonal polarisations.

The invention therefore proposes a new system of integration of antennas to RF front end modules that enables the problems posed to be resolved.

The invention consists in an RF reception front end block comprising a first substrate S1 and an RF integrated module integrated onto a second substrate S2 supporting a radiating part P2 of the antenna.

The antenna is formed in addition by a first radiating part P1 supported by the substrate S1 and by a junction constituted by a third radiating part P3 connecting the first radiating part P1 and the part P2 supported by the substrate S2.

The invention has the advantage of minimizing the interconnection losses between the RF module in SIP technology and the antenna, and the bulkiness of the RF module and antenna set.

Preferentially, said first radiating part P1 covers at least partially the upper side of the substrate S1.

According to a variant of the invention, a fourth substrate S4 covers the substrate S1, the substrate S4 having a higher permittivity than the substrate S1 and said first radiating part P1 covers at least partially the upper side of the substrate S4.

Preferentially, the RF components being implemented on the upper side of the substrate S2, a third substrate S3 constitutes a protective cover for the RF components of the RF module, and the second radiating part P2 covers at least partially the upper side of the third substrate S3.

According to a variant of the invention the RF components of the RF front end module being implemented on the lower side of the substrate S2, the second radiating part P2 covers at least partially the upper side of the substrate S2.

Preferentially the substrate S1 is of FR4 type, the substrates S2, S3 and S4 are of LTCC type.

Preferentially the connection junction P3 of the surface P1 and the surface P2 is a vertical metallization implemented on at least one of the sides of the RF module.

According to a variant of the invention the vertical metallization is implemented by at least one via.

According to a variant of the invention the vertical metallization is implemented by transmission lines.

According to a variant of the invention the connection junction P3 of the surface P1 and the surface P2 is implemented by electromagnetic coupling.

This solution can be applied to any antenna type requiring a ground plane under the radiating element, such as for example PIFA antennas.

In this way, the size of circuits is limited and the implementation costs are reduced, as a single action is required to install the associated front end modules and antennas.

Figure 2A:
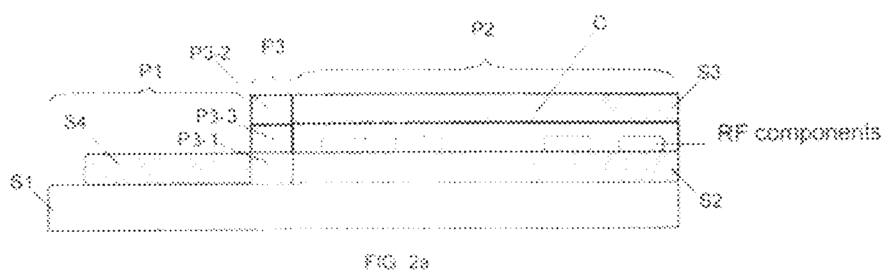
Figure 2B:
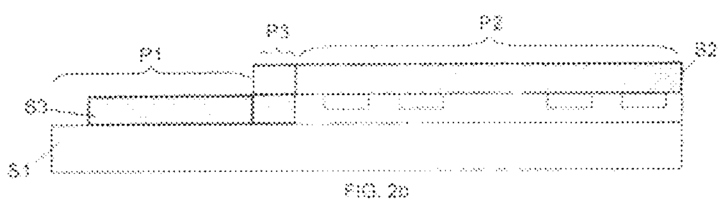
Figure 3:
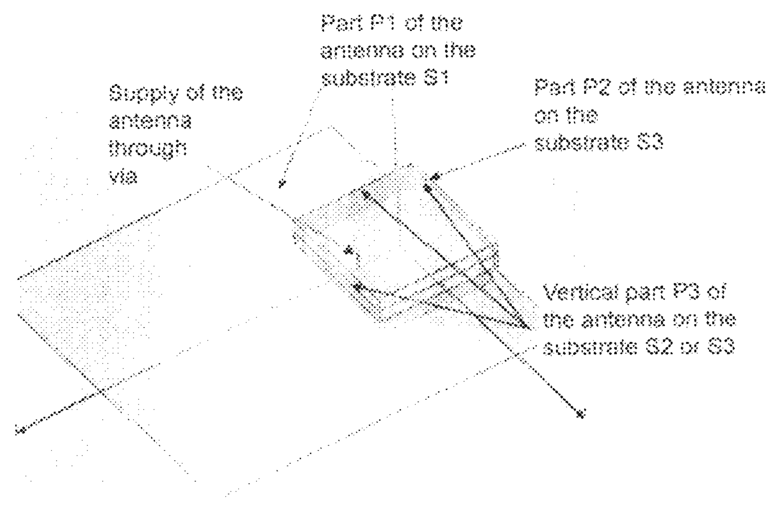
Figure 4:
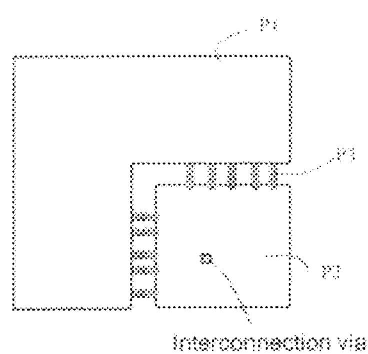
Figure 5:
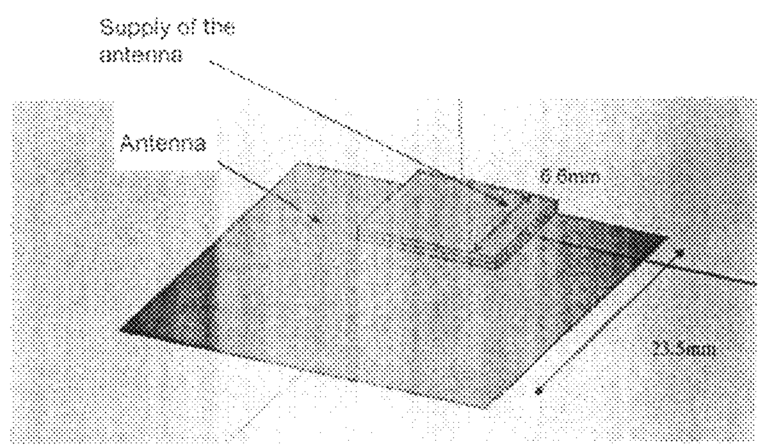
Figure 6A:
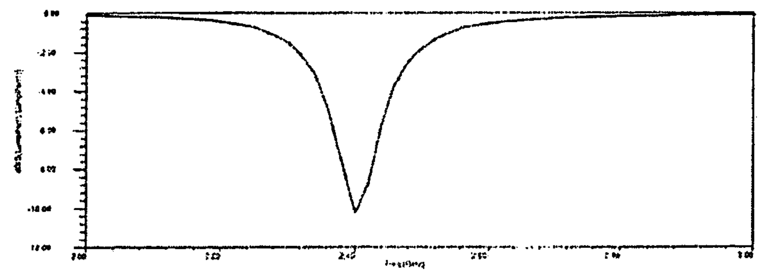
Figure 6B:
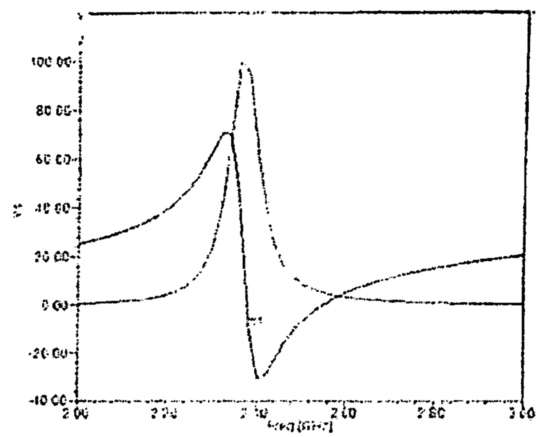
Figure 6C:
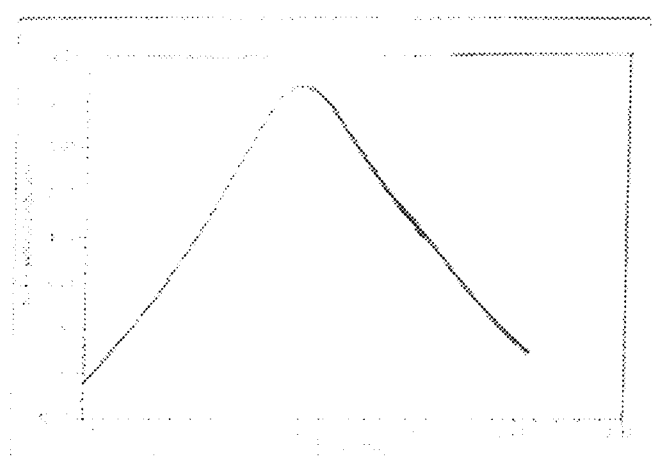
Figure 7:
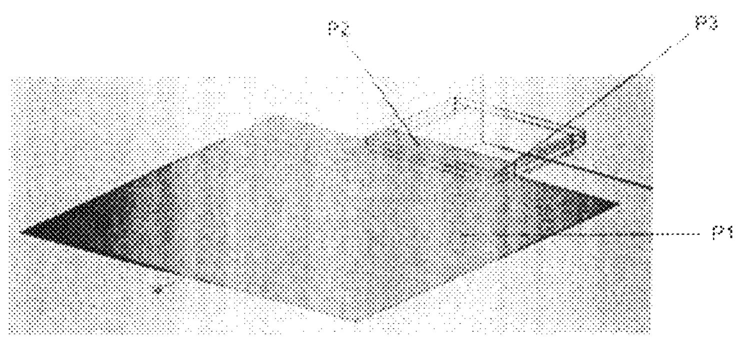
Figure 8:
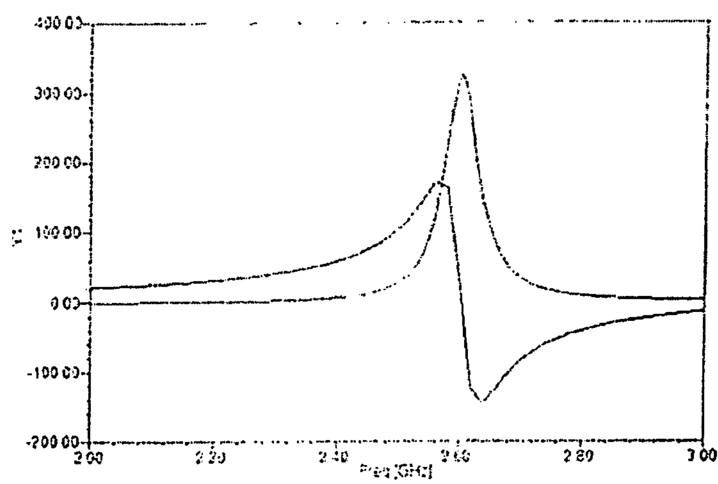
Figure 9:
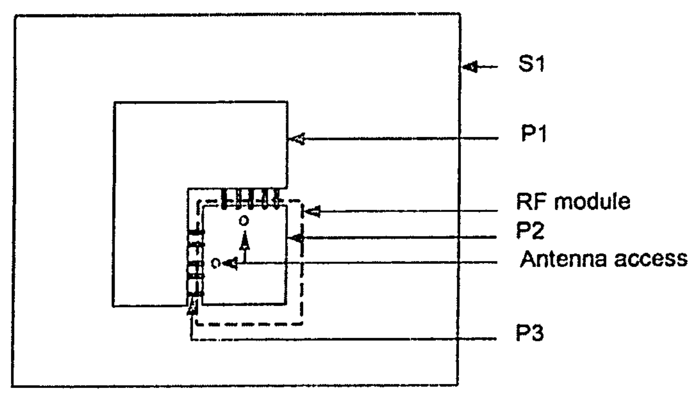
Figure 10:
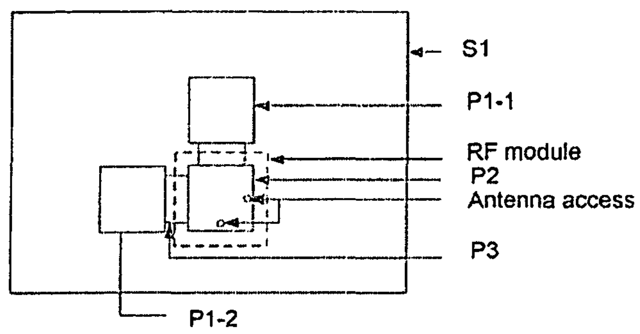

The characteristics and advantages of the aforementioned invention will emerge more clearly upon reading the following description made with reference to the drawings attached, wherein:

FIG. 1 already described, is an integration according to the prior art,

FIGS. 2*a* and 2*b* show two different embodiment principles of a front end block integrated according to the invention, FIG. 3 shows a view in 3 dimensions of a front end block integrated according to the invention, FIG. 4 shows a view of the 3 radiating parts of the antenna in a specific case, FIG. 5 shows a front end block integrated according to the invention, FIGS. 6*a* to 6*c* show diagrams corresponding to the simulation results with a front end block integrated according to the invention, FIG. 7 shows an embodiment of a front end block integrated according to the invention, FIG. 8 shows the simulation results with the front end block integrated according to FIG. 7, FIG. 9 shows an embodiment of a front end block integrated according to the invention and comprising a double access for a double polarization, FIG. 10 shows an embodiment of a front end block integrated according to the invention for a patch antenna reception in dual band and in a diversity of frequencies.

To simplify the description, the same references will be used in these latter figures to designate the elements fulfilling identical functions.

The main idea of the invention is to divide the support of the antenna function into 3 radiating parts, a first P1 whose emplacement corresponds to the substrate S1 on which lays the integrated RF front end module but not to the substrate S2, a second radiating part P2 that corresponds to that of the substrate S2 support of the integrated RF front end module and a third radiating part P3 that is that of the junction between the first and the second radiating part. Thus, the antenna can be directly supplied without an additional feeding line via a direct access to the RF integrated front end module.

FIGS. 2*a* and 2*b* describe examples of the embodiment principle with a "patch" antenna for which the size, enabling functioning at its first resonance, is greater than the size of the RF front end module.

FIG. 2*a* shows profile view of a front end block integrated according to the invention.

This block is composed of a substrate S1.

In an example where a "patch" type antenna is integrated, the lower surface of the substrate S1 is covered by a metallic conductive layer and a ground plane is etched on it.

For other antennas and in order to ensure the functioning, the ground plane can be partially etched.

The upper surface of the substrate S1 is covered by a conductive layer supporting the RF integrated front end module referred to as the "RF module" hereafter.

The RF module is itself realized by a substrate S2 covered by the components required for the RF functions, for example in LTCC technology, and has at least one access antenna. Alternatively, the components can be integrated in the substrate.

Different variants of the invention, depending on the RF module will thus be described:

According to a first variant, the components of the RF module are external to the substrate S2 and these components are then located on the upper part of the substrate S2. They are not opposite the substrate S1. FIG. 2*a* shows the substrate S3 playing the role of protective cover enabling protection of the components external to the substrate S2. This substrate S3 constituting the protective cover is used for the antenna function. The substrate S3 or S2 can be implemented in a way to form a cavity using radiating parts P3-2 and P3-3 to maintain the substrate S3 at a required height of the substrate S2, with respect to the height of the components external to the RF module.

On the upper side of the substrate S1 not covered by the substrate S2, the first radiating part P1 of the antenna is etched.

The substrate S1 can also, totally or partially, support a substrate S4, of a greater permittivity than for example an LTCC substrate, on which or in which the first radiating part of the antenna is etched.

As the substrates S1, S2, S3 and S4 can be multilayer substrates, it is thus possible to etch metal layers between the substrate layers constituting the multilayer substrate.

The size of the substrate S2 of the RF module is possibly bigger than the size of the radiating part specific to the RF functions. This part of the substrate S2 not used by the part specific to the functions of the RF module can subsequently be used in the same way for the antenna function. That is to say that this part of the substrate S2 can be either etched directly, or support a substrate S4, of permittivity greater than that for example of an LTCC substrate, on or in which a part of the antenna is etched.

The antenna function is implemented for example in the same material as the front end module itself. This enables in a single manufacturing procedure to implement the RF front end block with at least a part of the antenna function. According to the degree of integration desired linked with the reduction in the wavelengths, the substrate S4 is optional.

The third radiating part P3 of this antenna, in the vertical position, is a part of the junction between the first P1 and the second P2 parts of the antenna. It is situated both on/in the substrate S2 and on/in the area P3-1 not used by the RF functions of the substrate S2. In this example, this vertical radiating part P3 enables the radiating parts P1 and P2 of the antenna to be electrically connected by direct contact. The P3-1, junction between the radiating parts P1 and P2 is one of the substrate S2 or S4. Likewise the radiating part P3-2 is a part of the substrate S3. The radiating part P3-3 is a pure radiating part of the vertical junction between the 2 first parts P3-1 and P3-2. This vertical junction can also be implemented for example by metallization using one or several vias.

Another method may consist in connecting electro-magnetically the radiating parts P1 and P2 using an electromagnetic coupling between two coupled lines or any other system enabling an electromagnetic coupling.

Another method may consist in using for example coplanar lines, microstrip lines or conductive lines for the junction of these 2 parts. These lines then form a flexible connection layer.

In a preferential case, the antenna can thus be etched uniformly on a same substrate constituted of S3 and S4 totally or partially covering the substrates S1 and S2, as well as the junction between these 2 substrates. According to the degree of integration desired linked with the reduction in the wavelengths, the substrate S4 is optional.

According to a second variant of the invention shown in FIG. 2*b*, the components of the RF integrated front end module exterior to the substrate S2 and opposite the substrate S1, the components are located then on the lower part of the substrate S2. The substrate S2 is realized in a way to form a cavity enabling the substrate S2 to be at a required distance from the substrate S1.

The upper part of the substrate S2 can then support a ground plane on which the second radiating part P2 of the antenna will be etched.

A third conductive radiating part P3, in a vertical position can be implemented as previously described.

The antenna function is implemented preferentially in the same material as the front end module itself, for example of LTCC type. This enables in a single manufacturing process to produce the integrated front end block with at least one radiating part of the antenna function if required.

Several means can be implemented to transmit the RF signal between the RF front end module and the antenna such as for example:

1—by one or several vias,

2—via a microstrip, stripline, coplanar or grounded coplanar type transmission line, 3—via an electromagnetic coupling, for example of slot type.

In order to facilitate the integration of the antenna associated with the RF front end module, planar antennas will preferentially be used such as for example "patch" antennas, "PIFA (printed inverted F antenna)" antennas and slots.

FIG. 3 shows a 3 dimensional view according to the X, Y and Z axes of an integrated front end block.

It describes an example of a "patch" antenna for which the size, enabling a functioning at it first resonance, is greater than the size of the RF front end module. A first part of the metallization of the patch antenna is situated on the substrate S1 itself. A second conductive part of the patch antenna is situated on the substrate S3 covering the RF module. A third conductive part, in a vertical position, is situated both on/in the substrate S3 and on/in the area not used by the RF functions of the substrate S2. In this example, this vertical radiating part enables the radiating parts P1 and P2 of the "patch" antenna to be electrically connected by direct contact. This vertical metallization can be produced for example using one or several vias. The position of the antenna supply point enables functioning at its resonant frequency.

The position of the antenna with respect to the RF module (substrate S2) is according to:

- the supply point also known as the excitation point of the antenna,
- the position relative to the access antenna at the output of the RF front end module,
- the output number of the RF front end module. Preferentially, and to facilitate the routing of cards integrating an RF module or RF modules, the antenna does not cover the sides of the module having accesses that are used. In FIG. 4, an example of a "patch" antenna is shown for which only two sides are connected between the two radiating parts P1 and P2 of the antenna.

How ever, configurations can exist where there must be a compromise between the position of the antenna and the RF module and that, particularly of antenna excitation. In fact the topology of the antenna may require connections on several sides of the RF front end module, between the second radiating part P2 of the antenna (at maximum dimensions of the integrated (RF) front end module and the first radiating part P1 of the antenna on the substrate S1. Thus if the interconnections, between the antenna and the RF module on one hand, and the RF module and the substrate S1 on the other hand, are located on the same side of the RF module, the interconnections between the RF module and the substrate S1 must be routed on another layer using vias or metallized holes.

Particular embodiments corresponding to FIGS. 5 and 7 are next described.

FIG. 5 shows a "patch" antenna integrating a unit representing an integrated RF front end module. According to the description of the invention a radiating part of the patch antenna P1 is situated on a substrate S1 of FR4 type (permittivity=4.4, loss tangent=0.022, substrate thickness=1.4 mm). The second radiating part of the antenna P2 is transferred onto a substrate S3 of LTCC type (permittivity=9.4, loss tangent=0.0014, substrate thickness=0.65 mm) The square "patch" antenna side of 23.5 mm is placed on a ground plane square of 75 mm per side. A supply through vias is situated on the median axis at 6.6 mm from the edge. The simulation results are shown in FIGS. 6*a*, 6*b* and 6*c*. In FIG. 6*a*, the curve shows the adaptation of the antenna to the frequency of 2.4 GHz. In FIG. 6*b*, this curve shows the resonance (Im(Z)=0) of the antenna to approximately 2.4 GHz. FIG. 6*c* shows the response in frequency of the antenna gain and the diagram associated with 2.4 GHz. For a same resonance frequency the size of the antenna is reduced by 25% through the use of LTCC type materials with a permittivity that is higher than that of FR4.

The radiating results are equivalent to the response with the RF module to the nearest 0.5 dB.

FIG. 7 describes an antenna composed partially on the RF module with a supply of the "patch" antenna integrated into the integrated RF module. The simulation parameters are those of the preceding simulation. FIG. 8 shows a shift in resonant frequency at 2.6 GHz as the effective permittivity of the patch is weaker than when the RF front end module is practically inserted under the patch.

Different variants of the invention are considered:

In fact, PIFA, dual-band or multi-band patch antenna profiles can be applied to this integration solution. For this variant, multiple connections between the antenna accesses to different frequencies and the RF circuit of the substrate S2 are realized.

It is also possible to produce antenna diversity. Several antennas will therefore be etched on the free parts of substrates S1 or S2 or on the substrate S3.

It is also possible to produce a diversity of polarization by inserting a second polarization in the case of a "patch" antenna. A double access antenna enables 2 orthogonal excitations to be applied. FIG. 9 shows a diagrammatic top view of a diversity solution with a "patch" antenna. On the substrate S1 and S3 with a ground plane suitable for the etching of an antenna, are distinguished the first radiating part P1 and the second radiating part P2 of the antenna. The third interconnection radiating part is shown as an example by connection lines. The size of the RF module is shown as being greater than that of the second radiating part of the antenna.

FIG. 10 describes a diagrammatic top view of a solution with dual band and polarization diversity with a patch antenna. The radiating part P2 of the antenna forms a radiating part of the antenna at the highest frequency, for example 5 Ghz, and the radiating part P1-1 forms another radiating part of the antenna at the highest frequency while the radiating part P1-2 forms the radiating part of the antenna at the lowest frequency.

The invention claimed is:

1. A RF reception front end block comprising:

a first substrate, covered partially by a second substrate to form a first part of the first substrate covered by the second substrate and a second part of the first substrate that is not covered by the second substrate, the second substrate supporting an RF integrated front end module, and an antenna, wherein the antenna is formed by:

a first radiating part supported only by the second part of the first substrate which is not covered by the second substrate;

a second radiating part supported by the second substrate; and a third radiating part electrically connecting the first radiating part and the second radiating part, such that the antenna is etched on the first, second, and third radiating parts in addition and that the antenna is directly supplied via a direct access to the RF integrated front end module.

2. The RF reception front end block according to claim 1, wherein said first radiating part consists in, at least partially, an upper side of the first substrate.

3. The RF reception front end block according to claim 1, wherein the first substrate supports a fourth substrate, the fourth substrate having a higher permittivity than the first substrate and said first radiating part consists in, at least partially, an upper side of the fourth substrate.

4. The RF reception front end block according to claim 1, wherein a plurality of RF components are disposed on an upper side of the second substrate, a third substrate forms a protective cover covering the RF components of a RF module, and the second radiating part corresponds at least partially to an upper side of the third substrate.

5. The RF reception front end block according to claim 1, wherein a plurality of RF components of a RF module are disposed on a lower side of the second substrate opposite the first substrate, and the second radiating part covers at least partially an upper side of the second substrate.

6. The RF reception front end block according to claim 2, wherein the first substrate is of a FR4 type and the second substrate is of a LTCC type.

7. The RF reception front end block according to claim 1, wherein the third radiating part connecting the first radiating part and the second radiating part is a vertical metallization disposed on at least one side of a RF module.

8. The RF reception front end block according to claim 7, wherein the vertical metallization is disposed on at least one side of the RF module by at least one via.

9. The RF reception front end block according to claim 7, further comprising a front end module wherein the vertical metallization is implemented by transmission lines.

10. The RF reception front end block according to claim 1, wherein the third radiating part connecting the first radiating part and the second radiating part is implemented by electromagnetic coupling.

11. The RF reception frond end block according to claim 3, wherein the fourth substrate is of a LTCC type.

12. The RF reception front end block according to claim 4, wherein the third substrate is of a LTCC type.

13. The RF reception front end block according to claim 2, wherein a plurality of RF components are disposed on an upper side of the second substrate, a third substrate forms a protective cover covering the RF components of a RF module, and the second radiating part corresponds at least partially to an upper side of the third substrate.

14. The RF reception front end block according to claim 3, wherein a plurality of RF components are disposed on an upper side of the second substrate, a third substrate forms a protective cover covering the RF components of a RF module, and the second radiating part corresponds at least partially to an upper side of the third substrate.

15. The RF reception front end block according to claim 2, wherein a plurality of RF components of a RF module are disposed on a lower side of the second substrate opposite the first substrate, the second radiating part covers at least partially an upper side of the second substrate.

16. The RF reception front end block according to claim 3, wherein a plurality of RF components of a RF module are disposed on a lower side of the second substrate opposite the first substrate, and the second radiating part covers at least partially an upper side of the second substrate.

* * * * *